United States Patent [19]
Price et al.

[11] Patent Number: 5,109,045
[45] Date of Patent: Apr. 28, 1992

[54] FLAME RETARDANT POLYCARBONATE COMPOSITIONS

[75] Inventors: Ronald L. Price, Weirton, W. Va.; Charles E. Lundy, Krefeld-Uerdingen, Fed. Rep. of Germany; Sivaram Krishnan, Pittsburgh, Pa.

[73] Assignee: Miles Inc., Pittsburgh, Pa.

[21] Appl. No.: 615,196

[22] Filed: Nov. 19, 1990

[51] Int. Cl.⁵ .......................................... C08K 5/3417
[52] U.S. Cl. ......................................... 524/94; 525/67
[58] Field of Search ............... 524/94; 525/67, 91, 525/93, 92, 386, 285

[56] References Cited

U.S. PATENT DOCUMENTS

| | | | |
|---|---|---|---|
| 3,334,154 | 8/1967 | Kim | 525/469 |
| 3,382,207 | 3/1968 | Jaquiss | 524/284 |
| 3,535,300 | 10/1970 | Gable | 524/83 |
| 3,751,400 | 8/1973 | Crennan et al. | 528/196 |
| 3,775,367 | 11/1973 | Nouvernte | 524/165 |
| 3,836,409 | 9/1974 | Amelio et al. | 148/187 |
| 4,110,299 | 8/1978 | Mark | 260/37 PC |
| 4,223,100 | 9/1980 | Reinert | 525/146 |
| 4,351,920 | 9/1982 | Ariga et al. | 525/67 |
| 4,366,276 | 12/1982 | Freitag et al. | 524/94 |
| 4,552,911 | 11/1985 | Cohnen et al. | 524/94 |
| 4,786,686 | 11/1988 | Laughner et al. | 525/67 |
| 4,880,864 | 11/1989 | Paul et al. | 524/404 |

FOREIGN PATENT DOCUMENTS

| | | |
|---|---|---|
| 1066873 | 4/1967 | United Kingdom . |
| 1370744 | 10/1974 | United Kingdom . |
| 1516544 | 7/1978 | United Kingdom . |
| WO80/00084 | 1/1980 | World Int. Prop. O. . |

*Primary Examiner*—Veronica P. Hoke
*Attorney, Agent, or Firm*—Joseph C. Gil; Aron Preis

[57] ABSTRACT

A thermoplastic molding composition containing an aromatic polycarbonate resin, a flame retarding package and an impact modifier is disclosed. The impact modifier is a maleic anhydride-functionalized block copolymer which consist of polystyrene endblock and poly(ethylene/butylene) midblocks. Characterized in its improved impact performance and flame retardance, the composition is suitable for the manufacture of molded articles of improved properties.

5 Claims, No Drawings

FLAME RETARDANT POLYCARBONATE COMPOSITIONS

FIELD OF THE INVENTION

The invention is directed to a thermoplastic molding composition and more particularly to a flame retardant, impact resistant composition based on a polycarbonate resin.

SUMMARY OF THE INVENTION

A thermoplastic molding composition containing an aromatic polycarbonate resin, a flame retarding package and an impact modifier is disclosed. The impact modifier is a maleic anhydride-functionalized block copolymer which consists of polystyrene endblocks and poly(ethylene/butylene) midblocks. Characterized in its improved impact performance and flame retardance, the composition is suitable for the manufacture of molded articles of improved properties.

BACKGROUND OF THE INVENTION

Aromatic polycarbonate resins are well known and have long been used in molding compositions for the preparation of tough, dimensionally stable articles. The chemistry, synthesis, properties and applications of polycarbonates are extensively discussed in the manuscript Chemistry and Physics of Polycarbonates, by Schnell, Interscience, 1964 and Polycarbonates by Christopher and Fox, Reinhold, 1962.

Although polycarbonates have some inherent flame resistance, increasingly more stringent requirements for improved flame resistance are reflected in issuance of the large number of patents relating to this technology. Among the methods to improve flame retardance mention may be made of the addition or incorporation of large amounts of halogen (U.S. Pat. Nos. 3,751,400; 3,382,207 and 3,334,154). In U.S. Pat. No. 3,775,367 there is taught adding of an organic and/or an inorganic metal salt to the polycarbonate resin.

Additions of perfluoroalkane sulfonic acid salts of alkali metals and organic alkali salts of carboxylic acids have been disclosed in U.S. Pat. No. 3,836,490 and in U.S. Pat. No. 3,775,367. Also noted is German Published Patent No. 2,149,311 which discloses the use of insoluble alkali metal salts, particularly salts in inorganic acids phosphonic acids and sulphonic acids. Flame retardant polycarbonate compositions containing alkali metal salts or an inorganic acid are disclosed in U.S. Pat. No. 4,223,100. U.S. Pat. No. 3,535,300 discloses the use of small amounts of specified metal salts (which do not include alkali metal salts) in combination with halogen carried on the polymeric backbone or on an additive. U.S. Pat. No. 4,110,299 teaches adding of alkali or alkaline earth metal salts of organic acids in combination with additives such as inorganic halide and an organic monomeric or polyemic aromatic or heterocyclic halide improve the flame retardancy of an aromatic polycarbonate.

Also noted are the teaching in regard to the drip suppression of the compositions when they are exposed to a flame. In German Patent No. 2,535,262 there is a teaching to add fluorinated polyolefins such as polytetrafluroroethylene (PTFE) to a polycarbonate containing organic alkal metal salt to retard dripping. U.S. Pat. No. 4,110,299 discloses adding to a polycarbonate resin fluorinated polyolefin, fibrous glass or a siloxane, in combination with certain salts and an inorganic halide to diminish tendency to drip. In PCT application WO 80/00084 there is disclosed in Example 13 a blend of aromatic polycarbonate and a block copolymer of polycarbonate and polydimethylsiloxane (57%/43%) and including sodium salt of trichloro benzene sulfonic acid. The blend was noted to have improved resistance to stress crazing. The document generally discloses improved ductility, solvent resistance and flame retardance characteristic of blends of polycarbonates and a block copolymer of polycarbonate and polydiorganosiloxane.

Also relevant in this context is U.S. Pat. No. 4,880,864 which disclosed adding a metal salt of an inorganic acid to a polydiorganosiloxane copolycarbonate for improving the flame retardance of the resin. A flame resistant, impact modified polycarbonate resin was disclosed in U.S. Pat. No. 4,786,686. The improved composition is said to include a rubbery polymer containing residual ethylenic unsaturation and a fluorine containing polymer of the fibril forming type as additions to the polycarbonate resin.

DETAILED DESCRIPTION OF THE INVENTION

Aromatic polycarbonates within the scope of the present invention are homopolycarbonates and copolycarbonates and mixtures thereof.

The polycarbonates generally have a weight average molecular weight of 10,000–200,000, preferably 20,000–80,000 and their melt flow rate, per ASTM D-1238 at 300° C., is about 1 to about 65 gm/10 min., preferably about 2–15 gm/10 min. They may be prepared, for example, by the know diphasic interface process from a carbonic acid derivative such as phosgene and dihydroxy compounds by polycondensation (see German Offenlegungsschriften 2,063.050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2).

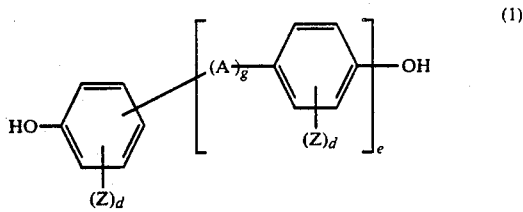

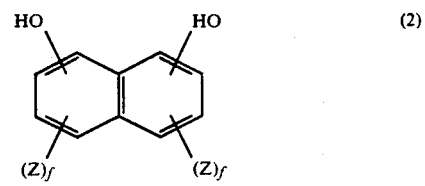

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO₂— or a radical conforming to

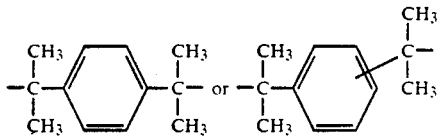

e and g both denote the number 0 to 1;
Z denotes F, Cl, Br or C₁–C₄-alkyl and if several Z radicals are substituents in one aryl radical, they may be identical or different from one another;
d denotes an integer of from 0 to 4; and
f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxy-phenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2,-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxybenzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05-2.0 mol % (relative to the bisphenols) of polyhydroxy compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri (4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxybenzoic acid, trimesic acid, cyanuric chloride and 3,3-bis-(4hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S. Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol a based homopolycarbonate resins differing in terms of their respective molecular weights and characterized in that their melt flow indices (MFR) per ASTM D-1238 are about 16.5-24, 13-16, 7.5-13.0 and 3.5-6.5 gm/10 min., respectively. These are products of Mobay Corporation of Pittsburgh, Pa.

Other polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

The polytetrafluoroethylene suitable for use in the present invention is well known and commercially available. It should have the characteristic that it forms polytetrafluoroethylenes are those described in U.S. Pat. Nos. 3,005,795 and 3,671,487 incorporated herein by reference and German Published Patent No. 2,535,262. A particularly preferred form of PTFE is available from DuPont as TEFLON Type 6 and is designated by the ASTM as Type 3.

The polytetrafluoroethylene may conveniently be used in amounts up to about 2 wt. % based on the weight of the total composition.

The halogenated imide suitable in the present context is characterized in that it contains at least 50, preferably at least 60 weight percent of halogen. The preferred halogen is bromine. The preferred halogenated imide conforms structurally to

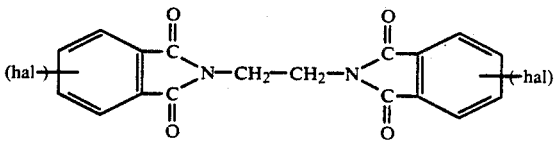

The most preferred halogenated imide is 1,2-bis-(tetrabromophthalimido)-ethane which is available under the trade name Saytex BT 93 from Ethyl Chemicals.

The salt useful in the present invention include those formed between an alkali metal or alkaline earth metal and an inorganic acid a complex.

Lithium sodium, potassium, magnesium, calcium and barium salts are preferred. Inorganic acids in the present context include any compound which meets the traditional tests of acidity and contains a complex ion. Preferred acids contain oxo-anion or fluor-anion complexes.

The most preferred are the alkali or alkaline-earth metal complex fluoro-anion salts or complex oxo-anion salts. This terminology being derived from the discussion of fluorine compounds contained in the text "Advanced Inorganic Chemistry" by F. A. Cotton and G. Wilkinson, Interscience Publishers, 1962, incorporation herein by reference. Suitable inorganic alkali metal complex fluoro anion salts include $KBF_4$, $K_3AlF_6$, $KAlF_4$, $K_2SiF_6$ $Na_3AlF_6$, $KPF_6$, $NaSbF_6$, $Na_3FeF_6$, $NaPF_6$, $Na_2SiF_6$, $Na_2TiF_6$, $NaBF_4$, $K_2TaF_7$, $K_2NbF_7$ $KSbF_6$, $K_2NiF_6$, $K_2TiF_6$, $LiBf_4$, $LiPF_6$, $Li_2BeF_4$, $Li_3AlF_6$, $MgSiF_6$, and $BaSiF_6$.

$Li_3AlF_6$, $BaSiF_6$, $KBF_4$, $K_3AlF_6$, $KalF_4$, $K_2SiF_6$ and $Na_3AlF_6$ are the preferred metal complex fluoro-anion salts and $Na_3AlF_6$ (cryolite) is the most preferred complex fluoro anion salt. Among the suitable complex oxo-anion salts are the alkali and alkaline-earth salts of carbonic acid, such as $Na_2CO_3$, $K_2CO_3$, $MgCO_3$, $CaCO_3$, $BaCO_3$ and $BaVO_3$. Other suitable salts are sulfates, phosphates and tungstenates. The most preferred salts of oxo-anion complex acids are $BaCO_3$ and $BaVO_3$.

The salts may be used in any effective amount up to about 2 wt. % based on the total weight of the copolymer. It is preferred to use no less than about 0.05 wt. % and more preferably to use no more than about 1.5% and more preferably no more than 0.8%.

The impact modifier in the present context is a maleic anhydride functionalized block copolymer of styrene and an elastomer. Suitable modifiers are thermoplastic ABA triblock copolymers which contain polystyrene end blocks and poly(ethylene/butylene) mid blocks. Most preferred are the modifiers which have a weight average molecular weight in the range of 50,000 to 80,000, a styrene content of about 15 to 28% and a bound maleic anhydride content of about 1-2% by weight. Suitable impact modifiers are available in commerce under the trade name Kraton RP6509 and Kraton FG1901X from Shell Chemicals Company.

The composition of the invention contains,
0.1 to 2.0, preferably 0.2 to 0.5 percent of PTFE,
0.1 to 1.0, preferably 0.2 to 0.4 percent of salt,
0.1 to 4.0, preferably 0.5 to 1.0 percent of halogenated imide, and
0.5 to 10, preferably 1.0 to 3.0 percent of the impact modifier.

Compositions in accordance with the invention were prepared and their properties determined. In the preparation of the compositions the properties of which are described below the following components were used:

The polycarbonate resin was Makrolon 2608 polycarbonate, a bisphenol A based homopolycarbonate having a melt flow index of about 11.0 gm/10 min. per ASTM D 1238, a product of Mobay Corporation.

The impact modifiers were Kraton RP 6509 and Kraton FG1901X,—designated in the table below as "A" and "B" respectively—both available from Shell Chemicals. The impact modifier used in the comparative examples was Paraloid EXL-2330—designated in the table below as "C"—an acrylate rubber, core-shell structured impact modifier, a product of Rohm & Haas.

The flame retarding package—denoted as FR agent in the table below—which was used in demonstrating the invention consisted of 0.20% PTFE, fibrilous, a product of Dupont
0.25% Cryolite, NaCryolite, a product of KaliChemie
0.50% of a , 1,2-bis-(tetrabromophthalimide)-ethane The composition described below were prepared by conventional means entailing melt blending, extrusion and pelletizing and the test specimens were molded from the composition by injection. In the preparation of these composition there was included a small amount of carbon black pigment which was introduced as a 1% polycarbonate concentrate,—designated in the table below as "conc."—having no criticality in the present context.

|  | 1 (control) | 2 | 3 | 4 |
|---|---|---|---|---|
| Composition. (%) | | | | |
| polycarbonate | 98.05 | 96.05 | 96.05 | 96.05 |
| FR-agent | 0.95 | 0.95 | 0.95 | 0.95 |
| Conc. | 1.00 | 1.00 | 1.00 | 1.00 |
| impact modifier | | | | |
| "A" | — | 2.00 | — | — |
| "B" | — | — | 2.00 | — |
| "C" | — | — | — | 2.00 |
| Properties: | | | | |
| Impact strength. Izod notched. (ft-lbs/in.) | | | | |
| $\frac{1}{8}''$ | 3.4 | 15.3 | 16.4 | 16.0 |
| $\frac{1}{4}''$ | 2.5 | 5.4 | 4.5 | 3.5 |
| critical thickness. mils | 126 | >250 | 221 | 186 |
| Flame retardance UL-94.1/16''** | 3.0 | 3.4 | 3.8 | 3.4 |
| Flame retardance UL-94.1/10''. 5 V test | Fail | Pass | Pass | Fail |

**All the composition, including the control, exhibit a rating of V-O and had no drips. The composition differed only in terms of their respective burn times as is noted in the table.

Although the invention has been described in detail in the foregoing for the purpose of illustration, it is to be understood that such detail is solely for the purpose and the variations can be made therein by those skilled in the art without departing from the spirit and scope of the invention except as it may be limited by the claims.

What is claimed is:

1. A thermoplastic molding composition comprising
   (i) a polycarbonate resin,
   (ii) fibrillating polytetrafluoroethylene
   (iii) a salt formed from an alkali metal or an alkaline earth metal and an inorganic acid complex ion,
   (iv) a halogenated imide, and
   (v) a maleic anhydride functionalized block copolymer said copolymer consisting of an ABA triblock containing polystyrene end blocks and elastomeric poly(ethylene/butylene) mid blocks,
said composition being characterized in that it achieves a pass rating in accordance with the flammability test of UL-94 5 V at 1/10 inch.

2. The thermoplastic molding composition of claim 1 wherein said polytetrafluoroethylene is present in an amount of 0.1 to 2.0 percent relative to the weight of the composition.

3. The thermoplastic molding composition of claim 1 wherein said salt is present in an amount of 0.1 to 1.0 percent relative to the weight of the composition.

4. The thermoplastic molding composition of claim 1 wherein said halogenated imide is present in an amount of 0.1 to 4.0, percent relative to the weight of the composition.

5. The thermoplastic molding composition of claim 1 wherein said impact modifier is present in an amount of 0.5 to 10.0, percent relative to the weight of the composition.

* * * * *